(12) United States Patent
Asaka et al.

(10) Patent No.: US 11,940,117 B2
(45) Date of Patent: Mar. 26, 2024

(54) RESIN COMPONENT FOR VEHICLE

(71) Applicant: Ichikoh Industries, Ltd., Isehara (JP)

(72) Inventors: Kenichi Asaka, Isehara (JP); Ryu Matsumoto, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/997,446

(22) PCT Filed: Apr. 30, 2021

(86) PCT No.: PCT/JP2021/017168
§ 371 (c)(1),
(2) Date: Oct. 28, 2022

(87) PCT Pub. No.: WO2021/221154
PCT Pub. Date: Nov. 4, 2021

(65) Prior Publication Data
US 2023/0265986 A1  Aug. 24, 2023

(30) Foreign Application Priority Data

Apr. 30, 2020  (JP) ................. 2020-080281

(51) Int. Cl.
| | | |
|---|---|---|
| *F21S 43/27* | (2018.01) | |
| *B29C 65/02* | (2006.01) | |
| *B29L 11/00* | (2006.01) | |
| *F21S 43/20* | (2018.01) | |

(52) U.S. Cl.
CPC ............ *F21S 43/27* (2018.01); *B29C 65/022* (2013.01); *F21S 43/26* (2018.01); *B29L 2011/0016* (2013.01)

(58) Field of Classification Search
CPC .......... F21S 43/27; F21S 43/26; B29C 65/022
See application file for complete search history.

(56) References Cited

U.S. PATENT DOCUMENTS

| | | | | |
|---|---|---|---|---|
| 4,733,335 A | * | 3/1988 | Serizawa | ............... F21V 29/83 362/547 |
| 6,017,141 A | * | 1/2000 | Sugiyama | ......... B29C 66/73365 362/546 |
| 6,050,706 A | * | 4/2000 | Ohtuka | ................. F21S 41/435 362/337 |
| 6,089,736 A | * | 7/2000 | Tanaka | .................... B60Q 1/26 362/520 |

(Continued)

FOREIGN PATENT DOCUMENTS

JP  2011-146279 A  7/2011

OTHER PUBLICATIONS

International Search Report dated Jun. 29, 2021 in PCT/JP2021/017168 filed on April 30, 2021 (2 pages).

*Primary Examiner* — Bryon T Gyllstrom
(74) *Attorney, Agent, or Firm* — Oblon, McClelland, Maier & Neustadt, L.L.P.

(57) ABSTRACT

A required weld strength is ensured even when the shape of a first resin member is formed in a desired design shape. A lamp lens and a lamp housing are provided. The lamp lens and the lamp housing are fixed to each other by welding under pressure. The lamp lens includes a body portion, a leg portion, and a welding portion. As a result, a required weld strength is ensured even when the shape of the body portion of the lamp lens is shaped in a desired design shape.

2 Claims, 8 Drawing Sheets

(56) References Cited

U.S. PATENT DOCUMENTS

| | | | | |
|---|---|---|---|---|
| 6,217,202 B1* | 4/2001 | Kageyama | ............... | B29C 65/02 |
| | | | | 362/267 |
| 7,815,354 B2* | 10/2010 | Yamazaki | ......... | B29C 66/73365 |
| | | | | 362/507 |
| 10,781,990 B2* | 9/2020 | Ferigo | ................... | B29C 66/542 |
| 10,816,160 B2* | 10/2020 | Sagesaka | ............... | B29C 66/112 |
| 2001/0028568 A1* | 10/2001 | Akiyama | .......... | B29C 66/12469 |
| | | | | 362/546 |
| 2005/0003159 A1* | 1/2005 | Ikeda | ........................ | F21V 3/04 |
| | | | | 428/156 |
| 2019/0176686 A1* | 6/2019 | Acero | .................. | B60Q 1/0005 |
| 2020/0263851 A1* | 8/2020 | Sagesaka | ............... | B29C 66/301 |

* cited by examiner

RESIN COMPONENT FOR VEHICLE

TECHNICAL FIELD

The present invention relates to a resin component for vehicle.

BACKGROUND ART

For example, there is a vehicle resin component in which a first resin member and a second resin member are fixed by welding under pressure, as shown in Patent Literature 1. The following is a description of the Patent Literature 1.

A vehicle lamp of the Patent Literature 1 is the one in which a convex portion of a translucent cover as the first resin member and a rib of a lamp body as the second resin member are fixed by vibration welding under pressure.

The vehicle lamp of the Patent Literature 1 can ensure a required bond strength at a low cost and without loss of design, even when the translucent cover is so formed as to extend along a curved surface shape.

CITATION LIST

Patent Literature

PTL1: Japanese Unexamined Patent Application Publication No. 2011-146279

SUMMARY OF THE INVENTION

Problems to be Solved by the Invention

Thus, it is important to ensure the required weld strength (bond strength) of the vehicle resin component (vehicle lamp) even when the shape of the first resin member (translucent cover) is formed in the desired design shape.

The problem to be solved by the present invention is to provide a vehicle resin component that can secure a required weld strength even when the shape of a first resin member is formed in a desired design shape.

Means for Solving the Problem

A vehicle resin component of the present invention includes: a first resin member; and a second resin member, wherein the first resin member and the second resin member are fixed by welding under pressure, the first resin member has a body portion, a leg portion provided on the body portion inclined toward the body portion side relative to a direction of the welding under pressure, and a welding portion that is provided on the leg portion in a manner to be bent toward an opposite side of the body portion relative to an inclination direction of the leg portion and that is welded to the first resin member under pressure.

In the vehicle resin component of the present invention, the first resin member is a lamp lens, the second resin member is a lamp housing, and the leg portion of the lamp lens is inclined relative to a front view direction in a manner to overlap, in the front view direction, with the lamp lens of a vehicle lamp adjacently mounted on a vehicle.

In the vehicle resin component of the present invention, the first resin member is a lamp lens, the second resin member is a lamp housing, and the body portion of the lamp lens and the lamp housing have wrap-around portions that wrap around to the leg portion side of the lamp lens.

Effect of the Invention

A vehicle resin component of the present invention can ensure a required weld strength even when the shape of a first resin member is formed in the desired design shape.

BRIEF DESCRIPTION OF THE DRAWINGS

FIG. 3(A) is an enlarged cross-sectional view of a part III in FIG. 2. FIG. 3(B) is a partially enlarged cross-sectional view of the case where the present invention is not performed.

MODE FOR CARRYING OUT THE INVENTION

Two examples of embodiments (examples) of a vehicle resin component according to the present invention will be described in detail below based on the drawings.

In this specification, front, rear, top, bottom, left, and right are front, rear, top, bottom, left, and right seen when the vehicle resin component (vehicle lamp) of the present invention is provided on a vehicle V.

Since the drawings are schematic diagrams showing the vehicle resin component of the present invention, detailed parts of the vehicle resin component of the present invention are omitted in the drawings. In the cross-sectional view, any hatching is omitted.

Description of Configuration According to First Embodiment

FIGS. 1 to 5 show a first embodiment of a vehicle resin component according to the present invention. The following is a description of a configuration of the vehicle resin component according to this first embodiment. In the drawing, a reference sign 1C represents the vehicle resin component according to this first embodiment (hereinafter simply referred to as "vehicle resin component").

(Description of Center-Side Rear Combination Lamp (Vehicle Resin Component) 1C)

Figure 1:
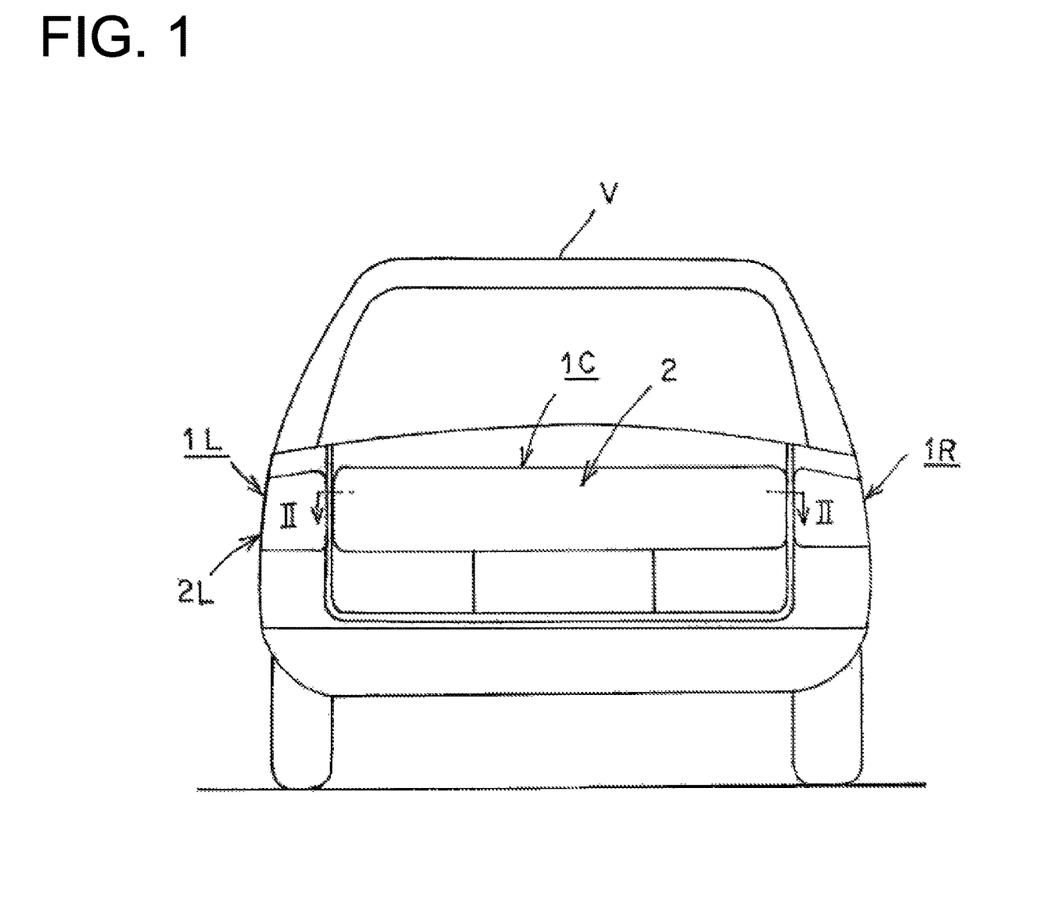
FIG. 1 is a rear view of a vehicle in use (viewing the front side from the rear side of the vehicle), showing a first embodiment of a vehicle resin component according to the present invention.

The vehicle resin component 1C is a vehicle lamp, in this example a center-side rear combination lamp, as shown in FIG. 1. The vehicle resin component 1C is hereafter referred to as a center-side rear combination lamp 1C.

The center-side rear combination lamp 1C is provided in the center portion in the rear portion of the vehicle V, in this example, on a movable-side back door. The vehicle resin component 1C is provided over most of the entire width direction (right/left direction) of the vehicle V.

Left and right side portions in the rear portion of the vehicle V, in this example, the fixed-side vehicle body, are provided with a left-side rear combination lamp 1L as a vehicle lamp, and also a right-side rear combination lamp 1R as a vehicle lamp, respectively.

The center-side rear combination lamp 1C, the left-side rear combination lamp 1L, and the right-side rear combination lamp 1R constitute a vehicle lamp with a sense of unity (connectedness) over the entire width direction (right/left direction) of the vehicle V, i.e., a rear combination lamp.

The center-side rear combination lamp 1C, as shown in FIGS. 1, 2, 3A, and 4, has a lamp lens 2 as a first resin member and a lamp housing 3 as a second resin member.

The lamp lens 2 and the lamp housing 3 are fixed to each other by welding under pressure (i.e., hot plate welding). The lamp lens 2 and the lamp housing 3 form a lamp chamber 4.

Figure 2:
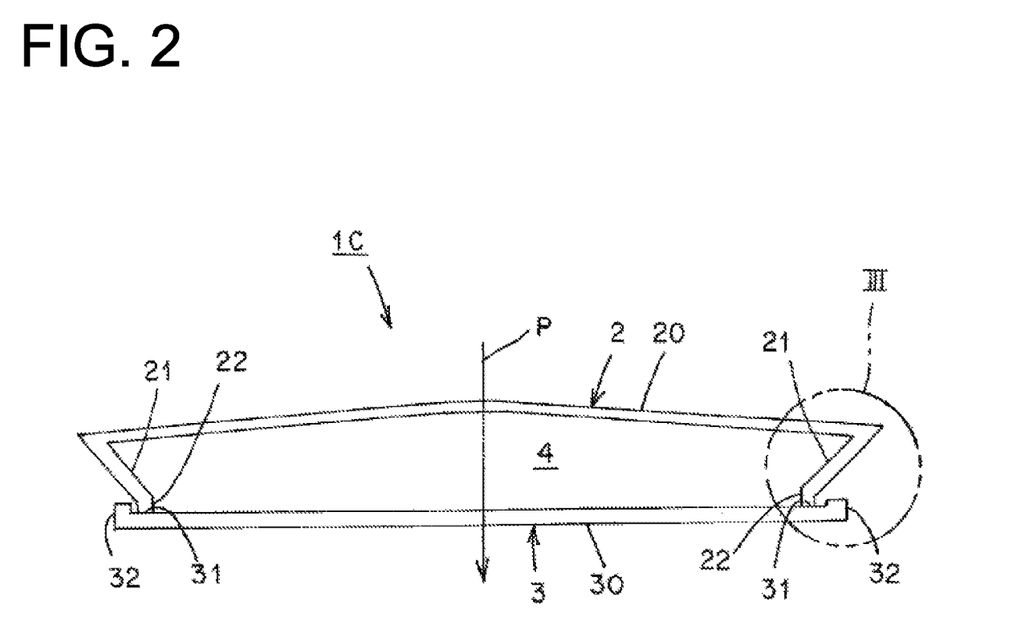
FIG. 2 is a cross-sectional view (cross-sectional view of the line II-II in FIG. 1).
Figure 3:
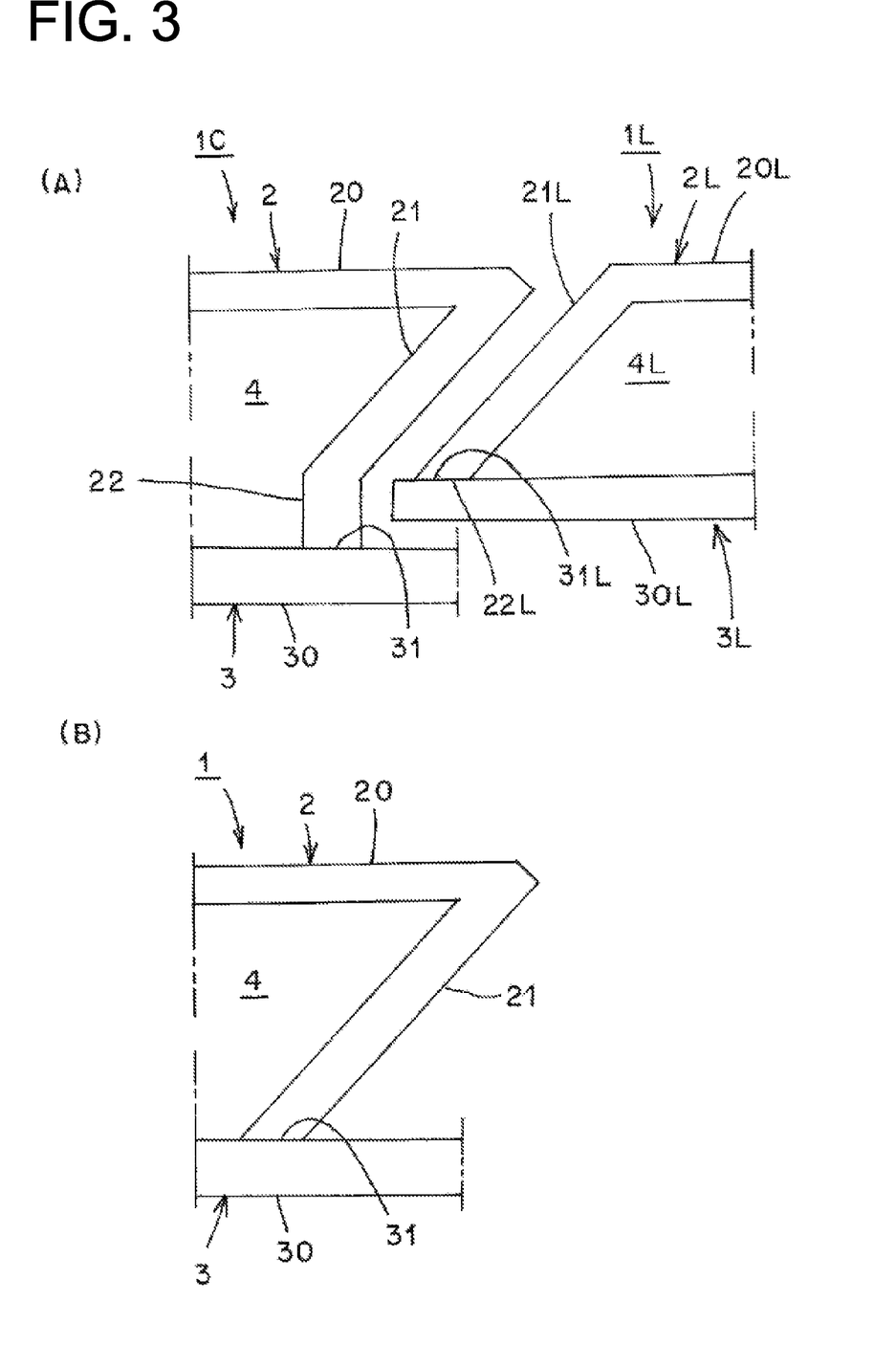
FIG. 3 is a partially enlarged cross-sectional view of an essential part.

Lamp units, optical members (inner lenses, etc.), decorative members (inner housings, inner panels, etc.), and mounting members (brackets, etc.), which are not shown in the drawing, are placed inside the lamp chamber 4.

The lamp unit has a light source (not shown). The lamp units include, for example, tail lamps, stop lamps, turn signal lamps, and back lamps.

(Description of Lamp Lens 2)

Figure 4:
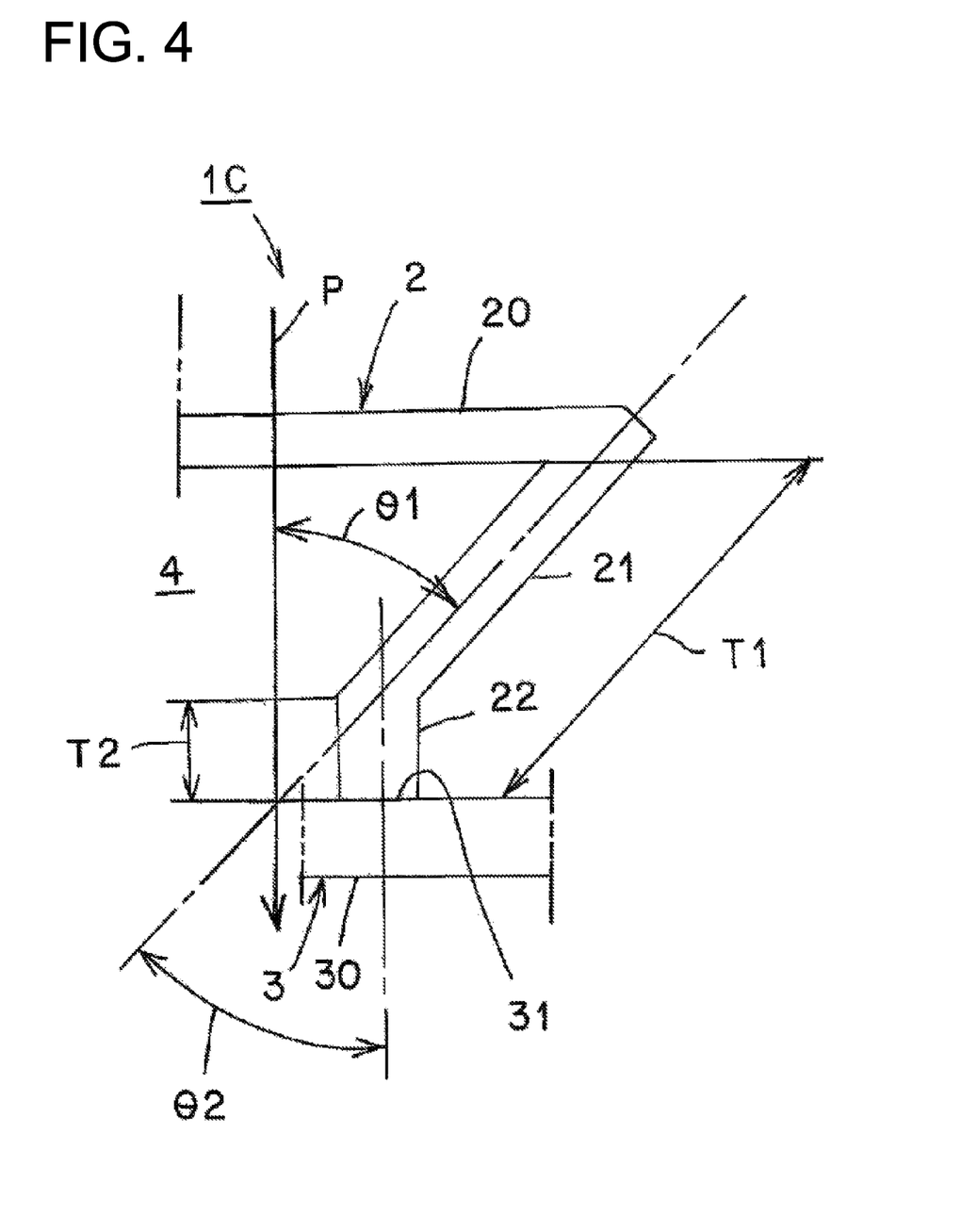
FIG. 4 is a partially enlarged cross-sectional view showing the essential part (partially enlarged cross-sectional view corresponding to FIG. 3(A)).

The lamp lens 2, in this example, is made of light-transmitting resin (e.g., acrylic). The lamp lens 2 has a body portion 20, a leg portion 21, and a welding portion 22.

The body portion 20 is plate-shaped having a plate thickness (wall thickness) of, in this example, about 1.0 mm to about 3.0 mm. The body portion 20 has a front view shape (viewing the front side from the rear side of the vehicle V) that is a long rectangular in shape in the transverse (right/left) direction. The thickness (wall thickness) of the body portion 20, relative to a diameter of an ejector pin, requires, in this example, a minimum of about 1.0 mm.

The leg portion 21 is inclined (bent) from the entire peripheral edge portion of the body portion 20 to the lamp housing 3 side (from the rear side to the front side of the vehicle V) and is integrally provided. In other words, the leg portion 21 is provided on the body portion 20 in a manner to be inclined to the body portion 20 side at an angle $\theta 1$ relative to a direction P of the welding under pressure. The angle $\theta 1$ is from about 45° to about 60° in this example.

As shown in FIG. 3(A), the leg portion 21 is inclined relative to the front view direction in a manner to overlap, in the front view direction (the front-rear direction of the vehicle V), with a lamp lens 2L of the left-side rear combination lamp 1L adjacently mounted on the vehicle V. This front view direction is substantially the same as, i.e., substantially parallel to the direction P of the welding under pressure described above.

The welding portion 22 is bent from the leg portion 21's tip (opposite end to the end on the body portion 20 side) in the opposite direction of the direction of bending the leg portion 21 and is integrally provided. In other words, the welding portion 22 is provided at the leg portion 21 in a manner to be inclined at an angle $\theta 2$ relative to the inclination direction of the leg portion 21, opposite to the body portion 20. The angle $\theta 2$ is, in this example, from about 20° to the above angle $\theta 1$.

A length T1 between the leg portion 21 and the welding portion 22 is, in this example, about 10 mm or more. The length T1 between the leg portion 21 and the welding portion 22 is a length of the leg portion 21 in the inclination direction from the body portion 20 to the lamp housing 3.

A length T2 of the welding portion 22 is, in this example, about 1.0 mm or more. The length T2 of the welding portion 22 is a length of the welding portion 22 in the centerline direction from an edge portion bent with the leg portion 21 to the lamp housing 3.

(Description of Lamp Housing 3)

The lamp housing 3, in this example, is made of light-non-transmitting resin (such as ABS resin). The lamp housing 3 has a body portion 30, a welding portion 31, and a convex portion 32.

The body portion 30, like the body portion 20 of the lamp lens 2, is plate-shaped, and has a front view shape that is a long rectangular shape in the transverse direction.

On the front face of the body portion 30 (a face facing the lamp lens 2), the welding portion 31 is integrally provided in a portion slightly closer to the center side from the entire peripheral edge portion of the body portion 30. The front face of the welding portion 31 is flush with the front face of the body portion 30.

The convex portion 32 is so provided as to integrally protrude from the entire peripheral edge portion of the body portion 30 toward the lamp lens 2 side (from the front of the vehicle V to the rear).

(Description of Step of Welding Lamp Lens 2 with Lamp Housing 3)

First, the lamp lens 2 and the lamp housing 3 are each stored and held in a jig by a suction pad or the like (not shown).

Next, the welding portion 22 of the lamp lens 2 and the welding portion 31 of the lamp housing 3 are softened by a heating plate (heating block) not shown in the drawing. The welding portion 22 of the lamp lens 2 and the welding portion 31 of the lamp housing 3 may be in contact or non-contact with the heating block.

Then, through a jig, the welding portion 22 of the lamp lens 2 is pressed onto the welding portion 31 of the lamp housing 3 in the solid arrow direction P in FIG. 2. This pressing direction P is perpendicular to the body portion 20 of the lamp lens 2 and the body portion 30 of the lamp housing 3.

Then, the welding portion 22 of the lamp lens 2 and the welding portion 31 of the lamp housing 3 are welded to each other. With this, the lamp lens 2 and the lamp housing 3 are integrally fixed and also form a lamp chamber 4.

The welding allowance of the welding portion 22 is about 0.5 mm at the maximum in this example. This means that the length T2 of the welding portion 22 before the welding is, in this example, about 1.0 mm or more, so the length of the welding portion 22 after the welding is, in this example, about 0.5 mm. As a result, the welding portion 22 is always present during the welding step, making it possible to ensure the rigidity and the pressing force in the pressing direction P.

As described above, the center-side rear combination lamp 1C as the vehicle resin component 1C according to this first embodiment is formed.

(Description of Left-Side Rear Combination Lamp 1L)

The left-side rear combination lamp 1L is described below. Like the center-side rear combination lamp 1C described above, the lamp lens 2L of the left-side rear combination lamp 1L is provided with the lamp lens 2L and a lamp housing 3L.

The lamp lens 2L and the lamp housing 3L are fixed to each other by the welding under pressure (i.e., hot plate welding). The lamp lens 2L and the lamp housing 3L form a lamp chamber 4L.

Lamp units, optical members (inner lenses, etc.), decorative members (inner housings, inner panels, etc.), and mounting members (brackets, etc.), which are not shown in the drawing, are placed in the lamp chamber 4L. The lamp unit has a light source (not shown). The lamp units include, for example, tail lamps, stop lamps, turn signal lamps, and back lamps.

The lamp lens 2L, in this example, is made of light-transmitting resin (e.g., acrylic, etc.). The lamp lens 2L has a body portion 20L, a leg portion 21L, and, a welding portion 22L.

The leg portion 21L's part that faces the center-side rear combination lamp 1C described above is provided from the edge portion of the body portion 20L to the lamp housing 3 side, sloping relative to the body portion 20L to the opposite side.

This will mount this left-side rear combination lamp 1L and the above center-side rear combination lamp 1C adjacent to each other on the vehicle V. Then, the leg portion 21L of the lamp lens 2L of the left-side rear combination lamp 1L and the leg portion 21 of the lamp lens 2 of the center-side rear combination lamp 1 overlap in the front view direction, as shown in FIG. 3(A).

The configuration of the right-side rear combination lamp 1R is symmetrical with the configuration of the left-side rear combination lamp 1L on right and left. For this reason, a description of the configuration of the right-side rear combination lamp 1R is omitted.

Description of Operation According to First Embodiment

The center-side rear combination lamp 1C according to this first embodiment has the above configuration, and its operation is described below.

Light sources of the lamp units of the rear combination lamps 1C, 1L, and 1R are turned on. The light is then emitted from the light source. Most of the light from the light source is transmitted through the body portions 20 and 20L of the lamp lenses 2 and 2L, and emitted to the outside.

In addition, a part of the light from the light source is transmitted through the leg portions 21 and 21L of the lamp lenses 2 and 2L, and is emitted to the outside. With this, the center-side (back door on movable side) rear combination lamp 1C, the left-side (vehicle body on fixed-side) rear combination lamp 1L, and the right-side (vehicle body on fixed-side) rear combination lamp 1R appear to shine in unison across the entire width direction (right/left direction) of the vehicle V. In other words, the rear combination lamps 1C, 1L, and 1R have a sense of unity (connectedness).

(Description of Effect of First Embodiment)

The center-side rear combination lamp 1C according to this first embodiment has the above configuration and operation, and its effect is described below.

The center-side rear combination lamp 1C according to this first embodiment is the one that is, in the lamp lens 2 as the first resin member, the leg portion 21 is provided with the welding portion 22 bent in the opposite direction relative to the inclination direction of the leg portion 21. With this, in the center-side rear combination lamp 1C according to this first embodiment, even when the leg portion 21 is inclined at the angle θ1 relative to the pressing direction P at the time of welding the lamp lens 2 to the lamp housing 3 under pressure, the welding portion 22 is substantially in the same direction as the pressing direction P, making it possible for the welding portion 22 to secure the rigidity and pressing force in the pressing direction P.

As a result, in the center-side rear combination lamp 1C according to this first embodiment, the lamp lens 2 can be fixed to the lamp housing 3 by the welding under pressure via the welding portion 22 even when the leg portion 21 of the lamp lens 2 is inclined relative to the body portion 20. Thus, the center-side rear combination lamp 1C according to this first embodiment can ensure the required weld strength even when the shape of the body portion 20 of the lamp lens 2 is formed in the desired design shape.

The center-side rear combination lamp (vehicle resin component, vehicle lamp) 1 without having been subjected to the present invention is described below with reference to FIG. 3(B). In FIG. 3(B), the symbols same as those in FIGS. 1, 2, 3A and 4 indicate the same articles.

This center-side rear combination lamp 1 is the one in which the leg portion 21 is directly welded under pressure to the welding portion 31 of the lamp housing 3 not via the welding portion 22. As a result, in this center-side rear combination lamp 1, at the time of welding the lamp lens 2 to the lamp housing 3 under pressure, the pressing force in the direction P is broken in the inclination direction of the leg portion 21, and the leg portion 21 is unable to ensure the rigidity and the pressing force in the pressing direction P. The greater the inclination angle θ1 of the leg portion 21, the more difficult it is to ensure the rigidity and the pressing force.

As the case may be, this makes it impossible for this center-side rear combination lamp 1 to ensure the required weld strength when the shape of the body portion 20 of the lamp lens 2 is formed in the desired design shape.

In the center-side rear combination lamp 1, making the plate thickness (wall thickness) of the lamp lens 2 about 3.0 mm or more, as the case may be, can secure the required weld strength. In this case, the increased thickness (wall thickness) of the lamp lens 2 increases weight and cost, and also causes sink and the like.

In contrast, the center-side rear combination lamp 1C according to this first embodiment has the leg portion 21 that is welded under pressure to the welding portion 31 of the lamp housing 3 via the welding portion 22. With this, the center-side rear combination lamp 1 of this first embodiment can ensure the required weld strength even when the shape of the body portion 20 of the lamp lens 2 is formed in the desired design shape.

Moreover, the center-side rear combination lamp 1C according to this first embodiment does not require the plate thickness (wall thickness) of the lamp lens 2 to be thicker than about 3.0 mm or more; in this example, the thickness of the lamp lens 2 can be as thin as about 1.0 mm to about 3.0 mm. As a result, the center-side rear combination lamp 1C according to this first embodiment can reduce the weight and cost of the center-side rear combination lamp 1C by reducing the thickness (wall thickness) of the lamp lens 2, and can prevent sink and the like.

Further, the center-side rear combination lamp 1C according to this first embodiment is the one where the leg portion 21 of the lamp lens 2 is inclined relative to the front view direction in a manner to overlap, in the front view direction, with the leg portion 21L of the lamp lens 2L of the left-side rear combination lamp 1L and right-side rear combination lamp 1R adjacently mounted on the vehicle V. As a result, with the center-side rear combination lamp 1C according to this first embodiment, a part of the light from the light source is transmitted through the leg portions 21, 21L of the lamp lenses 2, 2L and emits to the outside.

With this, the center-side rear combination lamp 1C according to this first embodiment, together with the left-side rear combination lamp 1L and the right-side rear combination lamp 1R, appear to shine in unison across the entire width direction (right/left direction) of the vehicle V. In other words, the rear combination lamps 1C, 1L, and 1R have a sense of unity (connectedness).

(Description of Leg Portion 23 in Modified Example)

Figure 5:
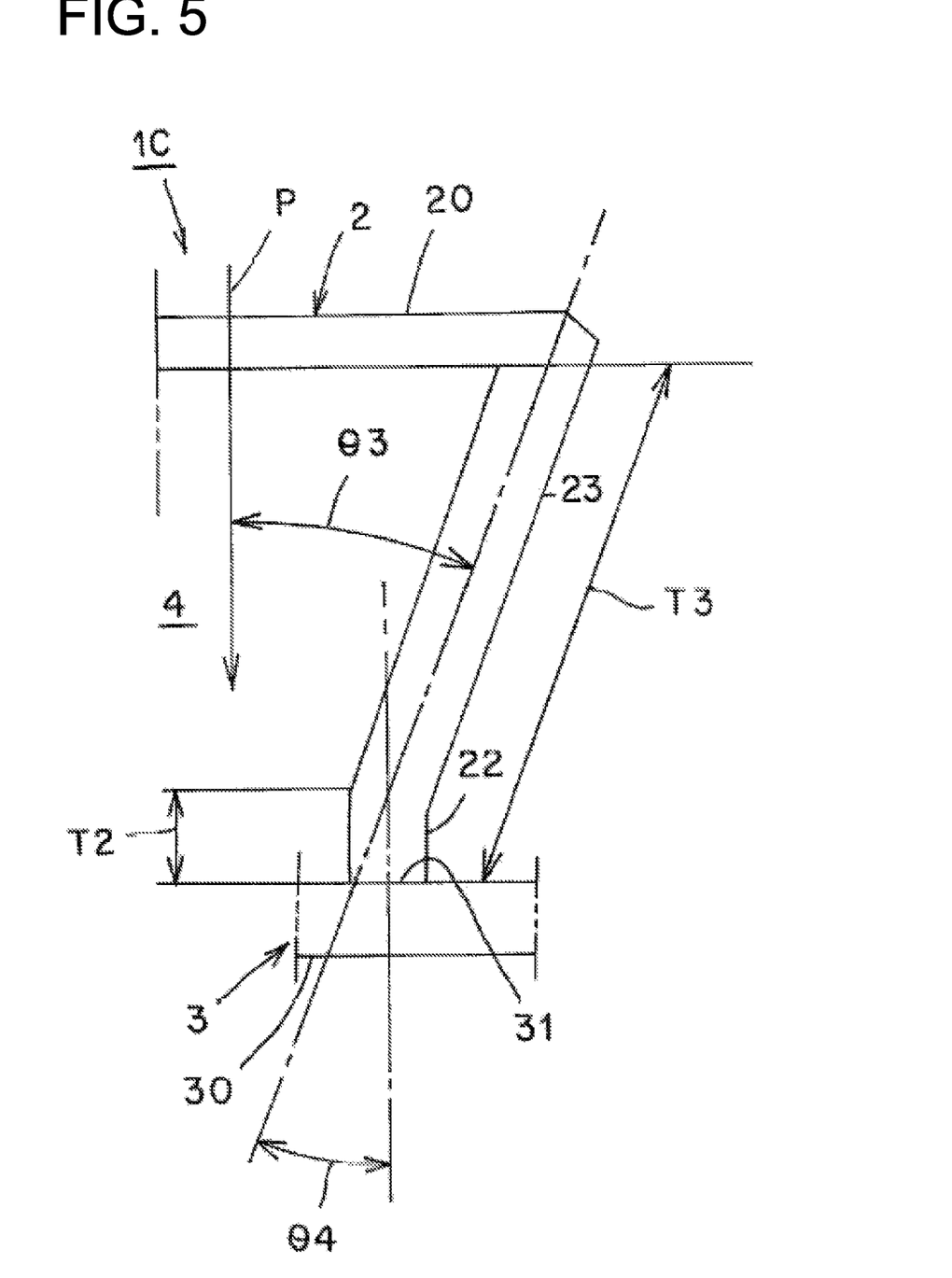
FIG. 5 is a partially enlarged cross-sectional view showing a modification of the essential part (partially enlarged cross-sectional view corresponding to FIG. 4).

A leg portion 23 of a modified example is described below with reference to FIG. 5. A length T3 of this leg portion 23, in the example, is about 30 mm or more, which is longer compared to the length T1 of the leg portion 21.

An inclination angle θ3 of the leg portion 23 is about 15° or more in this example. Further, an angle θ4 formed by the leg portion 23 and the welding portion 22 is, in this example, about 10° to the above angle θ3.

Even in the case of the leg portion 23 of this modified example, the same effect can be achieved as in the leg portion 21 described above. In particular, the length T3 of the leg portion 23 of this modified example is longer than the length T1 of the leg portion 21 described above. Therefore, the allowance of overlapping, in the front view direction, between the leg portion 23 of this modified example and the leg portion 21L of the lamp lens 2L of the adjacent rear combination lamps 1L and 1R is longer (larger). This improves the sense of unity (connectedness) between the center-side rear combination lamp 1C and the right and left-side rear combination lamps 1L and 1R.

(Description of Configuration, Operation, and Effect of Second Embodiment)

Figure 6:
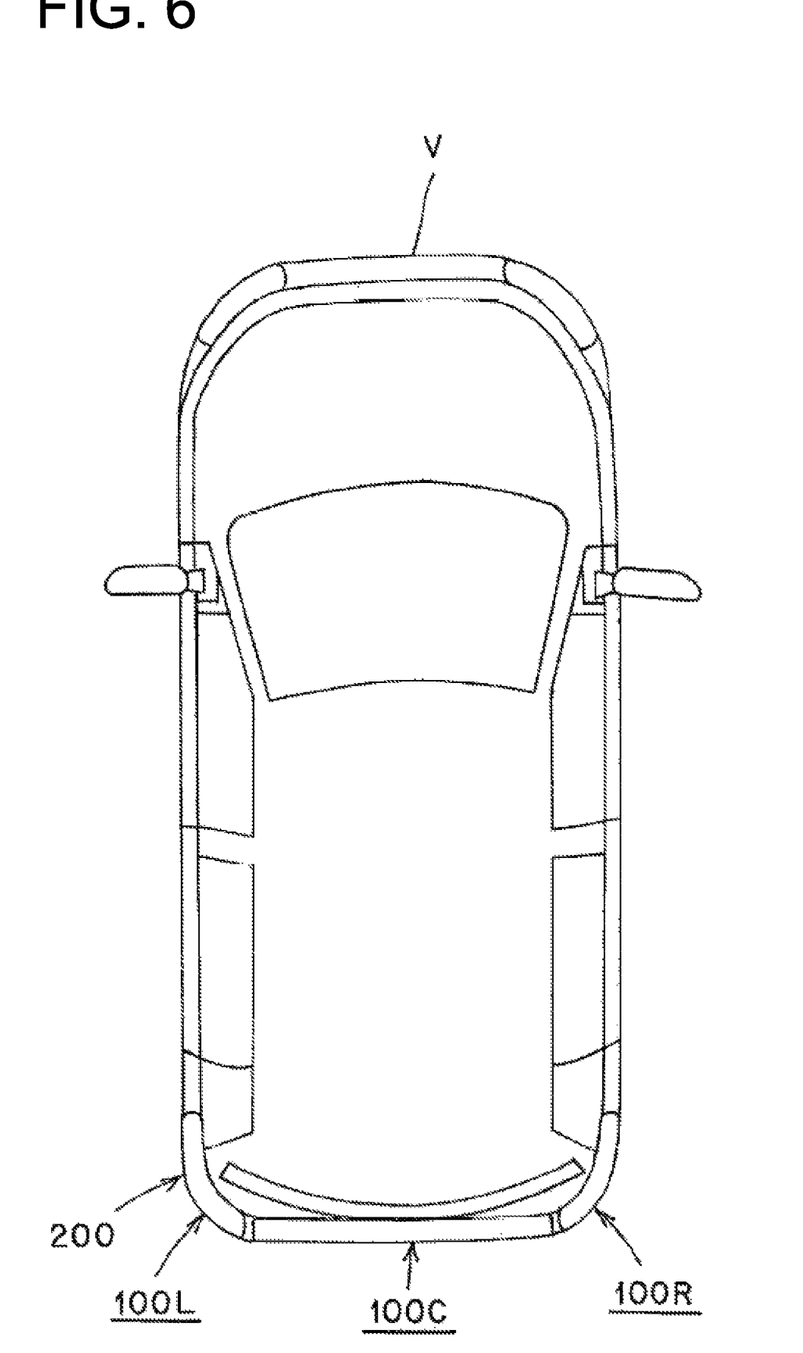
FIG. 6 is a flat rear view of the vehicle in use (viewing the down side from the upper side of the vehicle), showing a second embodiment of the vehicle resin component according to the present invention.
Figure 7:
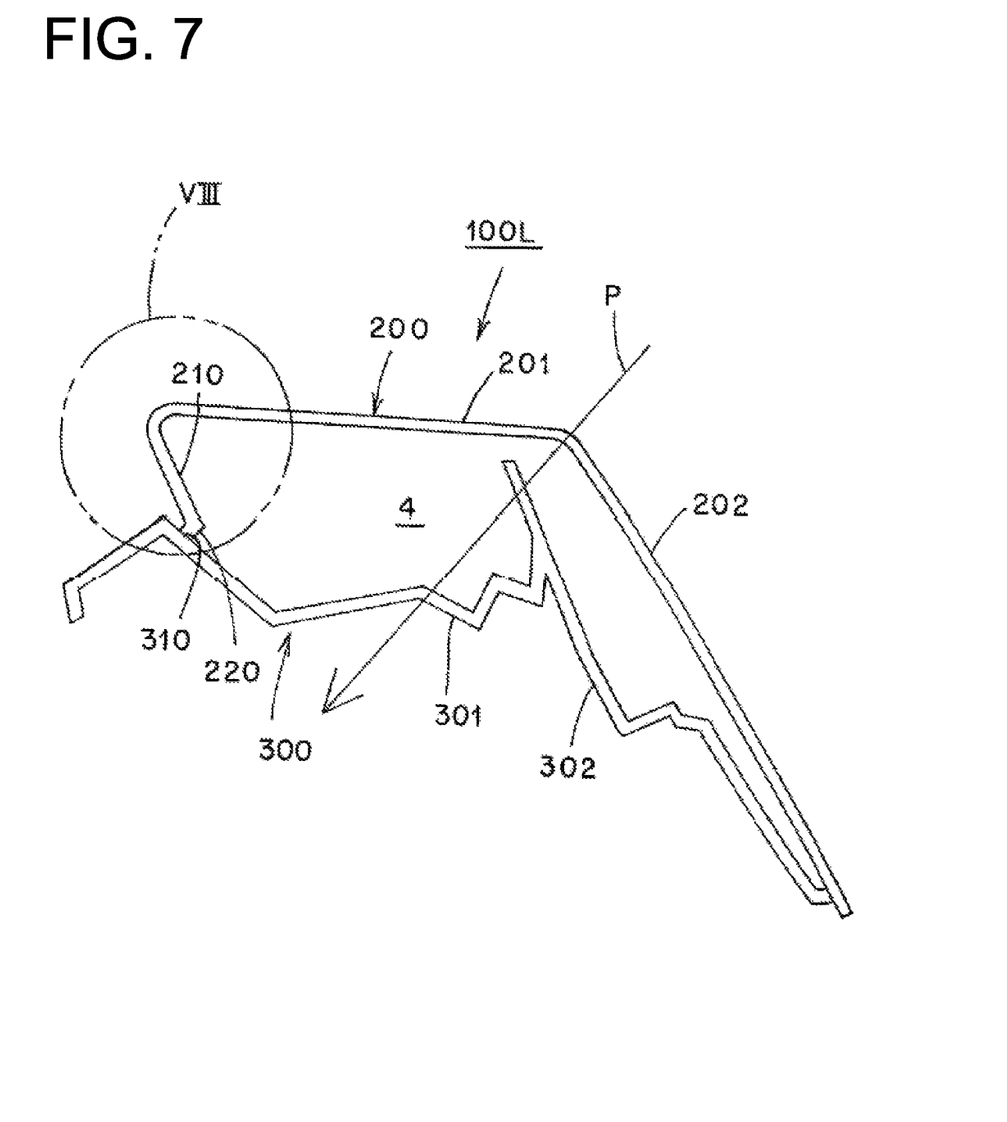
FIG. 7 is a cross-sectional view (cross-sectional view corresponding to FIG. 2).
Figure 8:
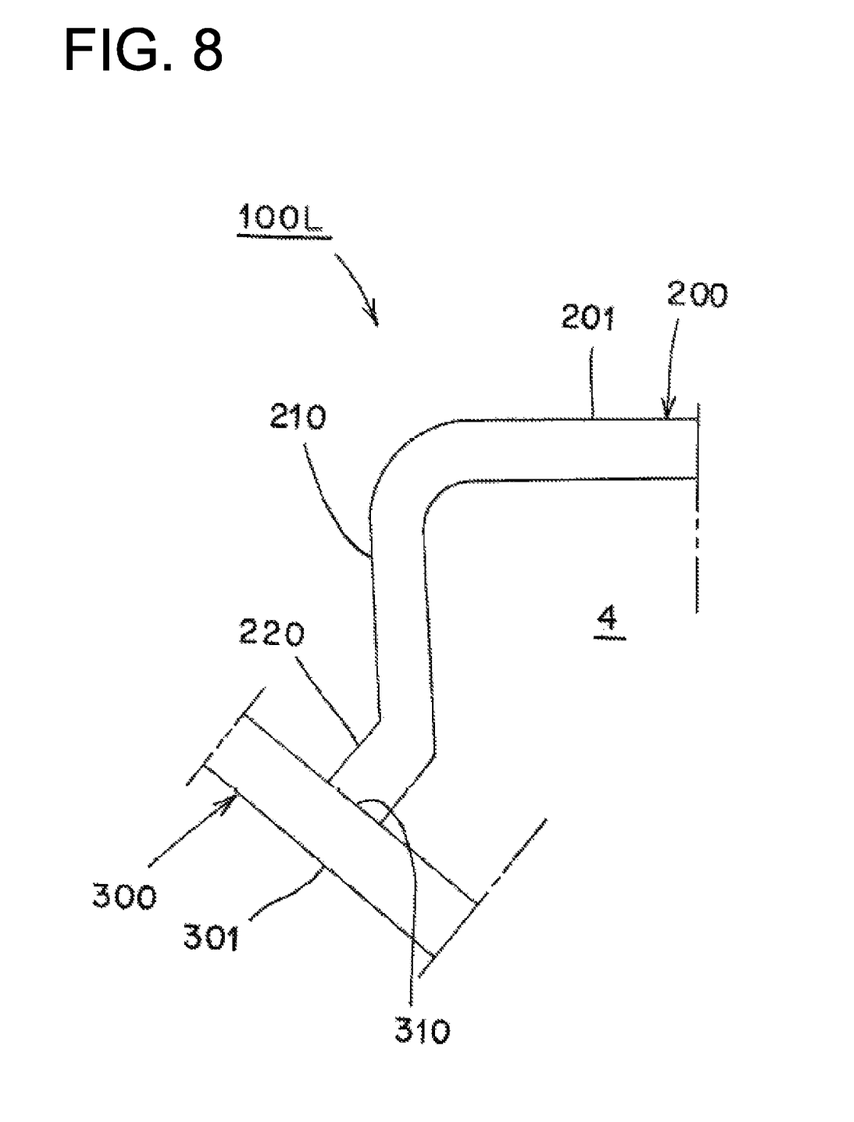
FIG. 8 is a partially enlarged cross-sectional view of an essential part (enlarged cross-sectional view of part VIII in FIG. 7).

FIGS. 6 to 8 show a second embodiment of the vehicle resin component according to the present invention. The configuration, operation, and effect of a vehicle resin component 100L of this second embodiment will be described below. In the drawings, the symbols same as those in FIGS. 1 through 5 indicate the same articles.

The vehicle resin component 1C according to the above first embodiment is the center-side rear combination lamp 1C. The vehicle resin component 100L according to this second embodiment is the left-side rear combination lamp 100L (right-side rear combination lamp 100R).

The center of the rear portion of the vehicle V is provided with a center-side rear combination lamp 100C. On the left and right sides in the rear portion of the vehicle V, and on the left and right sides of the center-side rear combination lamp 100C, a left-side rear combination lamp 100L and a right-side rear combination lamp 100R are respectively provided.

The left-side rear combination lamp 100L is described below. The configuration of the right-side rear combination lamp 100R is symmetrical with the configuration of the left-side rear combination lamp 100L on right and left. For this reason, a description of the configuration of the right-side rear combination lamp 100R is omitted.

The left-side rear combination lamp 100L has a lamp lens 200, a lamp housing 300, and a lamp housing. The lamp lens 200 and the lamp housing 300 are fixed to each other by a welding under pressure (i.e., hot plate welding). The lamp lens 200 and the lamp housing 300 form the lamp chamber 4.

Lamp units, optical members (inner lenses, etc.), decorative members (inner housings, inner panels, etc.), and mounting members (brackets, etc.), which are not shown in the drawing, are placed inside the lamp chamber 4. The lamp unit has a light source (not shown). The lamp units include, for example, tail lamps, stop lamps, turn signal lamps, and back lamps.

The lamp lens 200 is made of light-transmitting resin (e.g., acrylic). The lamp lens 200 has a body portion 201, a leg portion 210, a welding portion 222, and a wrap-around portion 202.

The leg portion 210's part that faces the center-side rear combination lamp 100C is provided from the edge portion of the body portion 201 to the lamp housing 3 side, sloping to the body portion 201 side.

The lamp housing 300 is made of light-non-transmitting resin (such as ABS resin). The lamp housing 300 has a body portion 301, a welding portion 310, and a wrap-around portion 302.

The body portion 201 and the body portion 301 are placed inside the vehicle V. Meanwhile, the wrap-around portion 202 and the wrap-around portion 302 are placed outside of the vehicle V, and on both the right and left sides of the vehicle V. In other words, the body portion 201 and the body portion 301 have the wrap-around portion 202 and the wrap-around portion 302 that wrap around to the leg portion 210 side of the lamp lens 200.

The part, of the leg portion 210 of the lamp lens 200, that faces the center-side rear combination lamp 100C is provided from the edge portion of the body portion 201 to the lamp housing 300 side, sloping to the body portion 201.

The welding portion 220 of the lamp lens 200 is bent from the tip of the leg portion 210 in the opposite direction of the direction of bending the leg portion 210 and is integrally provided.

The welding portion 220 of the lamp lens 200 and the welding portion 310 of the lamp housing 300 are fixed to each other by the welding under pressure. This forms the lamp chamber 4.

Since the vehicle resin component 100L according to the second embodiment has the above configuration, the same operation and effect as those of the vehicle resin component 1C according to the first embodiment described above can be achieved.

In particular, the vehicle resin component 100L of this second embodiment, even when the wrap-around portions 202 and 302 and the lengths of the wrap-around portions 202 and 302 are longer in the front/rear direction of the vehicle V, can secure the required weld strength.

In other words, as the lengths of the wrap-around portions 202 and 302 increase in the front/rear direction of the vehicle V, the pressing direction P slopes from the vertical direction to the right/left direction in FIG. 7. This increases the leg portion 210's inclination angle relative to the pressing direction P.

However, since the vehicle resin component 100L according to this second embodiment has the welding portion 220 at the tip of the leg portion 210, the required weld strength can be secured even when the leg portion 210's inclination angle relative to the pressing direction P is increased.

(Description of Examples Other than First and Second Embodiments)

The above first and second embodiments describe the examples which use, as the vehicle resin components 1C, 100L, for the center-side rear combination lamp 1C, and the left-side rear combination lamp 100L (the right-side rear combination lamp 100R). However, the present invention can also use, as the vehicle resin component, for a vehicle lamp other than the rear combination lamp, or for any vehicle component other than the vehicle lamp, such as an optical member (inner lens, etc.) and a decorative member (inner housing, inner panel, etc.).

In the above first and second embodiments, the welding portions 22 and 220 each have a straight line shape. However, in the present invention, as long as the welding portions 22, 220 can ensure the rigidity and the pressing force in the pressing direction P, the welding portions 22, 220 may have a shape other than the straight shape, such as a curved shape.

Further, in the above first and second embodiments, the length T2 of the welding portions 22 and 220 before the welding is about 1.0 mm or more. However, in the present invention, the length T2 of the welding portions 22 and 220 before the welding may be about 0.5 mm or more. In other words, since the welding allowance of the welding portions 22 and 220 is about 0.5 mm, it is sufficient that the welding portions 22 and 220 is still present after the welding thereby to ensure the rigidity and the pressing force in the pressing direction P.

Incidentally, the present invention is not limited to the first embodiment described above.

DESCRIPTION OF REFERENCE NUMERALS

1C: center-side rear combination lamp 1C (vehicle resin component, vehicle lamp)
1L: left-side rear combination lamp (vehicle lamp)
1R: right-side rear combination lamp (vehicle lamp)
2: lamp lens (first resin member)
20: body portion
21: leg portion
22: welding portion
23: leg portion
3: lamp housing (second resin member)
30: body portion
31: welding portion
32: convex portion
4: lamp chamber
2L: lamp lens
20L: body portion
21L: leg portion
22L: welding portion
3L: lamp housing
30L: body portion
31L: welding portion
4L: lamp chamber
100C: center-side rear combination lamp 1C (vehicle lamp)
100L: left-side rear combination lamp (vehicle resin component, vehicle lamp)
100R: right-side rear combination lamp (vehicle resin component, vehicle lamp)
200: lamp lens (first resin member)
201: body portion
202: wrap-around portion
210 leg portion
220 welding portion
300 lamp housing (second resin member)
301: body portion
302 wrap-around portion
310: welding portion
P: pressing direction
T1: dimension length
T2 dimension length
T3 dimension length
V: vehicle
θ1: angle
θ2: angle
θ3: angle
θ4: angle

The invention claimed is:

1. The vehicle resin component, comprising:
a first resin member; and
a second resin member, wherein:
the first resin member and the second resin member are fixed by welding under pressure,
the first resin member has:
a body portion,
a leg portion provided on the body portion inclined toward the body portion side relative to a direction of the welding under pressure, and
a welding portion that is provided on the leg portion in a manner to be bent toward an opposite side of the body portion relative to an inclination direction of the leg portion and that is welded to the first resin member under pressure, and wherein:
the first resin member is a lamp lens,
the second resin member is a lamp housing, and
the leg portion of the lamp lens is inclined relative to a front view direction in a manner to overlap, in the front view direction, with the lamp lens of a vehicle lamp adjacently mounted on a vehicle.

2. The vehicle resin component, comprising:
a first resin member; and
a second resin member, wherein:
the first resin member and the second resin member are fixed by welding under pressure,
the first resin member has:
a body portion,
a leg portion provided on the body portion inclined toward the body portion side relative to a direction of the welding under pressure, and
a welding portion that is provided on the leg portion in a manner to be bent toward an opposite side of the body portion relative to an inclination direction of the leg portion and that is welded to the first resin member under pressure, and wherein:
the first resin member is a lamp lens,
the second resin member is a lamp housing,
the leg portion of the lamp lens is inclined relative to a front view direction in a manner to overlap, in the front view direction, with the lamp lens of a vehicle lamp adjacently mounted on a vehicle, and
the body portion of the lamp lens and the lamp housing have wrap-around portions that wrap around to the leg portion side of the lamp lens.

* * * * *